United States Patent [19]
Leib et al.

[11] Patent Number: 4,764,781
[45] Date of Patent: Aug. 16, 1988

[54] UNIVERSAL TRANSLATIONAL AND ROTATIONAL FILM DRIVE MECHANISM

[75] Inventors: Kenneth G. Leib, Wantagh; Suey Jue, deceased, late of Hicksville, both of N.Y., by Catharine Jue, executrix

[73] Assignee: Grumman Aerospace Corporation, Bethpage, N.Y.

[21] Appl. No.: 19,264

[22] Filed: Feb. 26, 1987

[51] Int. Cl.$^4$ ............................................. G03B 39/04
[52] U.S. Cl. ........................................ 354/65; 354/160
[58] Field of Search ................................... 354/65, 160

[56] References Cited

U.S. PATENT DOCUMENTS

| | | | |
|---|---|---|---|
| 2,413,272 | 12/1946 | Wheelwright | 354/160 |
| 2,665,620 | 1/1954 | King et al. | 354/160 |
| 2,931,268 | 4/1960 | Gelb | 354/160 |
| 2,989,890 | 6/1961 | Dressler | 353/5 |
| 3,049,966 | 8/1962 | Gruner | 354/160 |
| 3,151,927 | 10/1964 | Angst et al. | 353/5 |
| 3,182,577 | 5/1965 | Ohnaka | 354/160 |
| 3,580,150 | 5/1971 | Watson et al. | 354/65 |

FOREIGN PATENT DOCUMENTS 1396297 6/1975 United Kingdom ................ 354/160

*Primary Examiner*—Michael L. Gellner
*Attorney, Agent, or Firm*—Pollock, VandeSande & Priddy

[57] ABSTRACT

Prior art optical correlator systems can perform only translation or rotation. Moreover, images obtained from these prior art systems are blurred due to movements of the target. In the present optical correlator system, to compare symbols on a particular frame of a film with predefined symbols stored in a memory, a novel driving mechanism which can both translate and rotate the film is used. The driving mechanism includes a translation device which has a plurality of gears and rollers mounted in a platform within a housing which may be filled with a fluid having an index of refraction corresponding to that of the film. Motors are coupled to the housing for translating and rotating the driving mechanism so that selected symbols on the film may be compared both linearly and rotatively with predefined symbols. The driving mechanism may further be used as an image motion compensator for eliminating blurring caused by target movements.

14 Claims, 7 Drawing Sheets

UNIVERSAL TRANSLATIONAL AND ROTATIONAL FILM DRIVE MECHANISM

THE FIELD OF THE INVENTION

The present invention relates to a film drive mechanism, and more particularly to a film drive mechanism which can be used for both optical correlation and image motion compensation.

BACKGROUND OF THE INVENTION

In aerial reconnaissance, cameras used must have the added flexibility of providing for film analysis, i.e., correlation with some previously defined symbols. For correlating, there is a need for obtaining a film record containing symbols representative of the target of interest. Also, to avoid having only one perspective of the view, for example only overhead views, there is a need for obtaining a record of the target of interest at different angles. After the target has been recorded onto film, there is further a need to analyze this film, to ascertain what the target represents. Consequently, the of interest film is indexed by frame (or orientation) for the purpose of fabricating any target matched filter at any orientation. The indexed film can then be played back at any orientation for any target or scene. For example, the selected scene can be rotated, thereby enabling the target—if present in the film—to be detected without resorting to a plurality of scenes having the same perspective. This indirectly increases the capacity of a correlator memory by not requiring the same to store all views, thereby freeing the memory to store other targets instead.

But in order to fabricate such target matched filter, and the subsequent comparison of targets therewith, a film drive mechanism has to be able to both translate and rotate. No such device exists prior to the present invention.

Further, since most of the targets are moving at the time records thereof are made, it is imperative that some mechanism be used to compensate for the blurring caused by the movement. A standard practice in aerial reconnaissance involves the use of elaborate optical and mechanical means. The present invention film driving mechanism eliminates the need for such elaborate means.

BRIEF DESCRIPTION OF THE PRESENT INVENTION

The present invention optical correlation and image motion compensation device is capable of driving a continuous strip of film—of various standard sizes—both linearly and rotatively.

A translational driving mechanism is mounted to a platform which is rotatable within a housing. The translational mechanism has a center aperture aligned with an opening in the housing. An of interest roll of film is held and guided in the translational driving mechanism by a plurality of gears, rollers and take up spools, which are driven linearly by a translation motor coupled to the housing.

A second motor, also coupled to the housing, is used to drive the platform, and consequently the translational driving mechanism and the film, rotatively. The housing may be filled with a fluid which has an index of refraction corresponding to that of the film. This enables warpage, scratches and nicks on the film to be optically compensated.

When used to compensate for image motions, the driving mechanism is controlled by a processor means such that the strip of film is moved proportionally to the movement of the of interest target, thereby compensating for possible blurring of the image resulting from target movement.

The above-mentioned objects and advantages of the present invention will be more clearly understood when considered in conjunction with the accompanying drawings, in which:

DETAILED DESCRIPTION OF THE INVENTION

In an optical correlator, the basic operation is to move a film around so that (1) optical memories may be fabricated from the film or (2) the of interest film may be compared with predefined symbols to see if the of interest film has thereon the predefined symbols.

Figure 1:
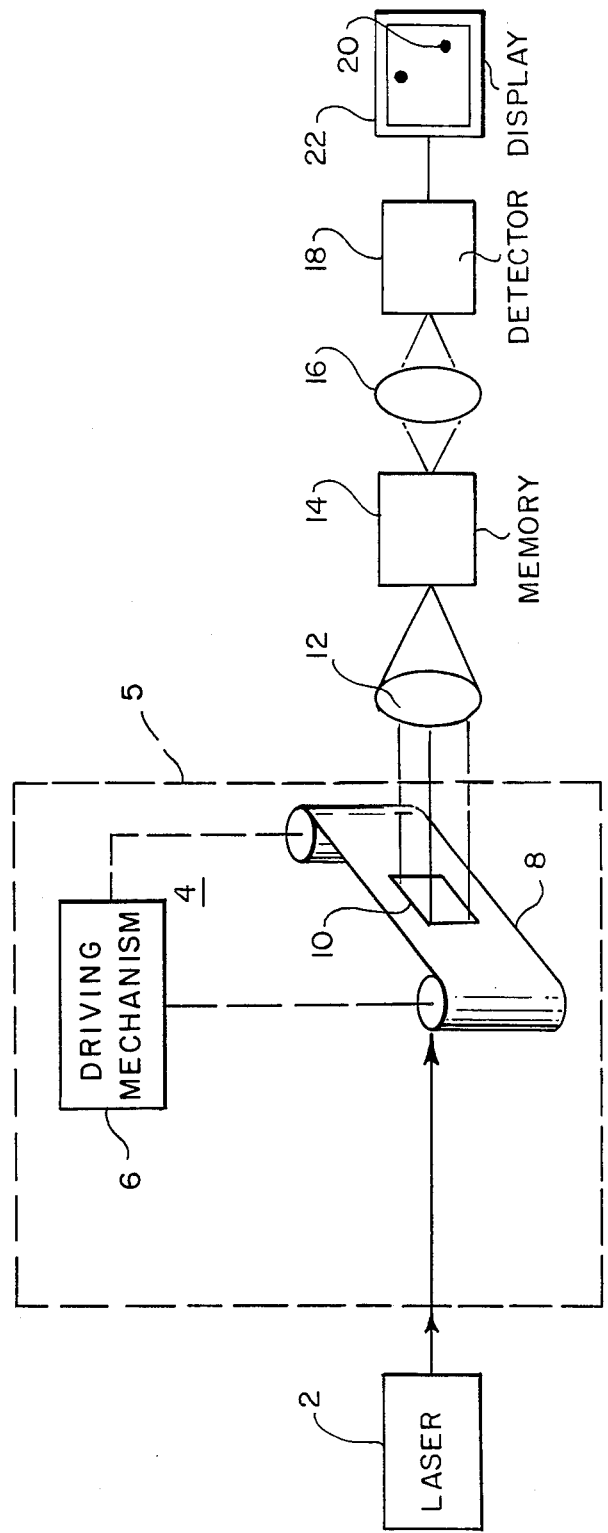
FIG. 1 is a simplified block diagram showing the incorporation of the present invention apparatus in the overall operation of an optical correlator.

In an overall optical correlator system, the operation to move the film around is done in accordance with such flight parameters as speed, altitude and aspect reconnaissance. As shown in FIG. 1, such system includes a laser 2 directing a light to the present invention apparatus 4, which includes a driving mechanism 6 and a roll of film 8, positioned within a container 5, superimposed on an aperture 10. This aperture would have an optically acceptable glass or fused silica to maintain the integrity of containers when fluid (to be discussed later) is added thereto. The light beam from laser 2 is directed at aperture 10 and the frame of film incident thereon, which frame has been indexed in accord with some a priori plan of film analysis. Whatever symbols happen to be on that film frame are directed to a lens 12, which refocuses the image from the frame to a memory 14. Lens 12 has the property of taking the Fourier Transform of the image on the film and presenting it at filter 14, which is a conventional type of matched filter memory.

The image on the film frame is compared with that of memory 14 and the result therefrom is sent to a second lens 16, which refocuses the result to a detector 18 which may be, for example, a charge-coupled device. Lens 16 also takes a Fourier Transform, this time of the output of the matched filter. The result presented on detector 18 is known as the correlation plane. If there is a match between a symbol on the film with a predefined symbol of memory 14, a bright spot, for example 20, is shown on display 22. Display 22 corresponds to the correlation plane presented to the detector 18.

Figure 2:
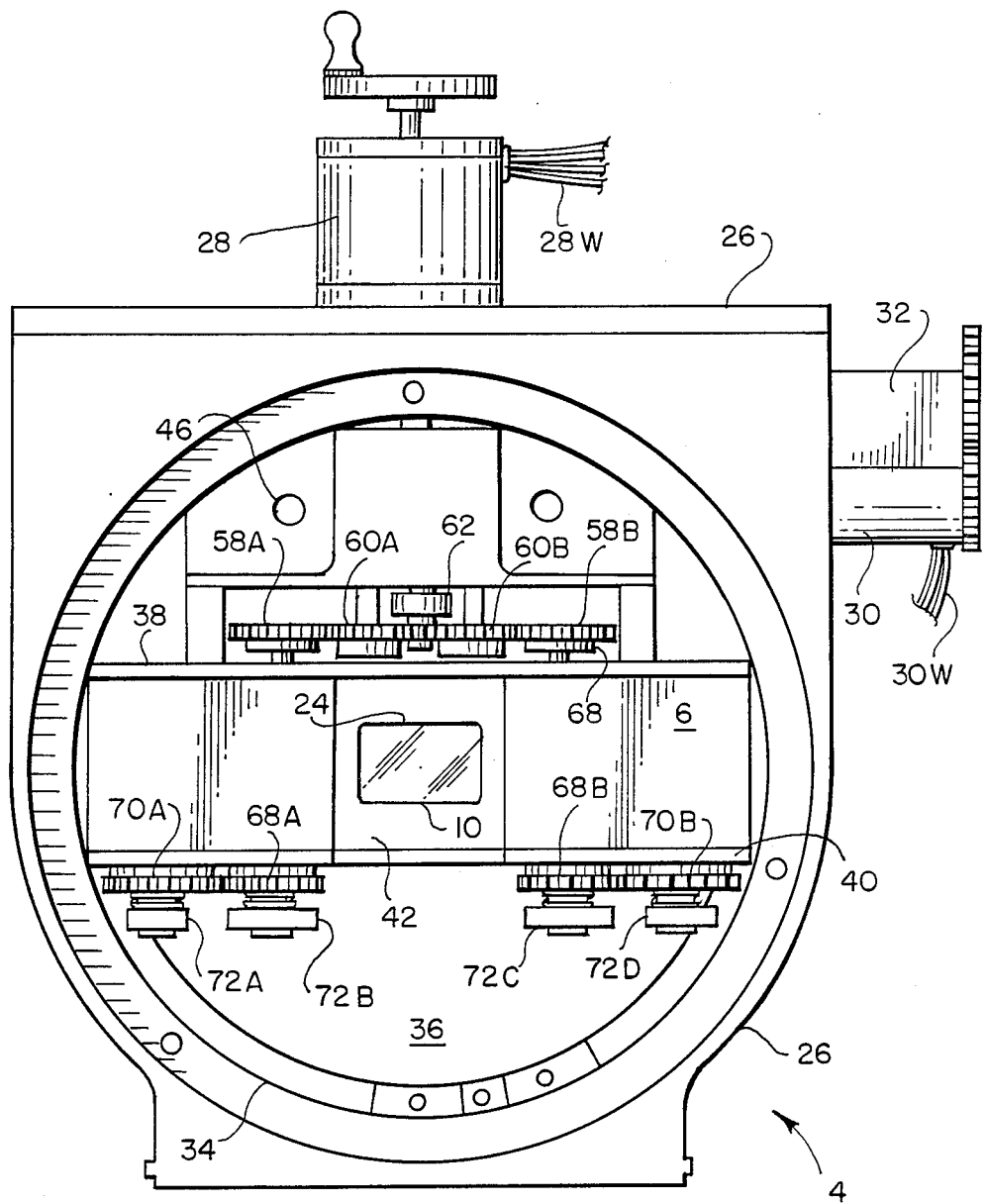
FIG. 2 is a front view of the present invention apparatus.
Figure 3:
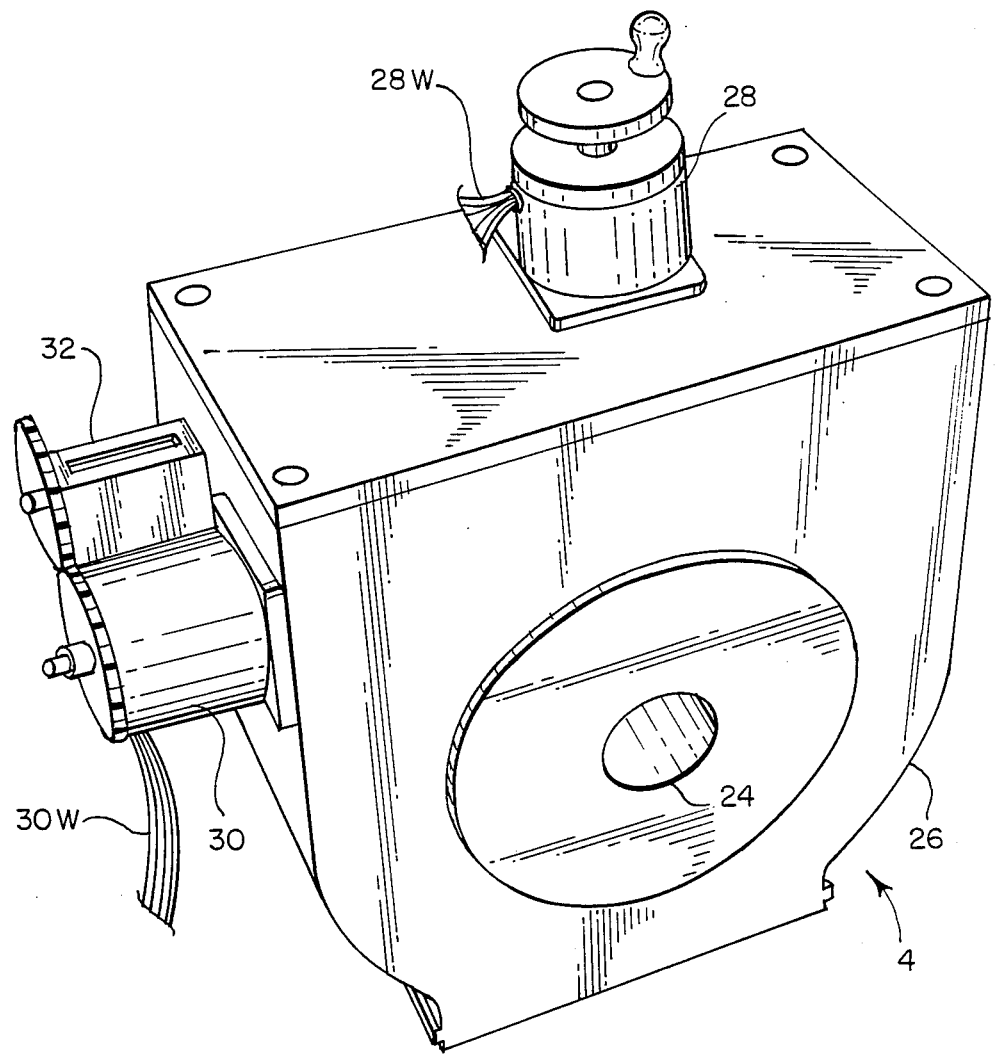
FIG. 3 is a back perspective view of the same apparatus.
Figure 5B:
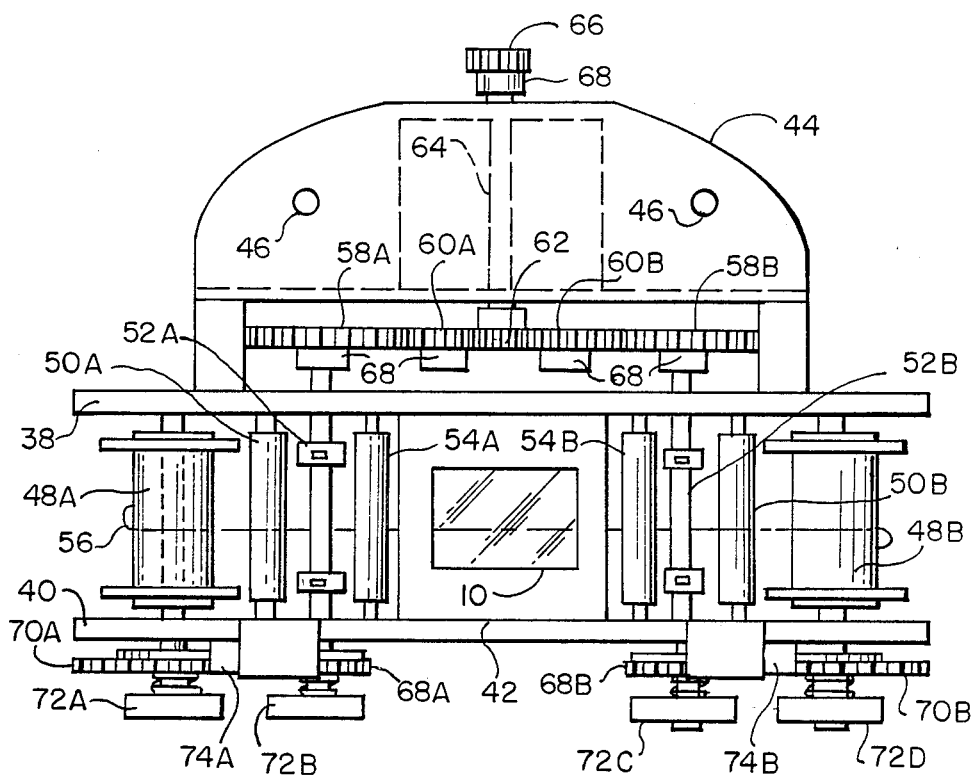
FIG. 5B is a front view of the driving mechanism of FIG. 4A.
Figure 5C:
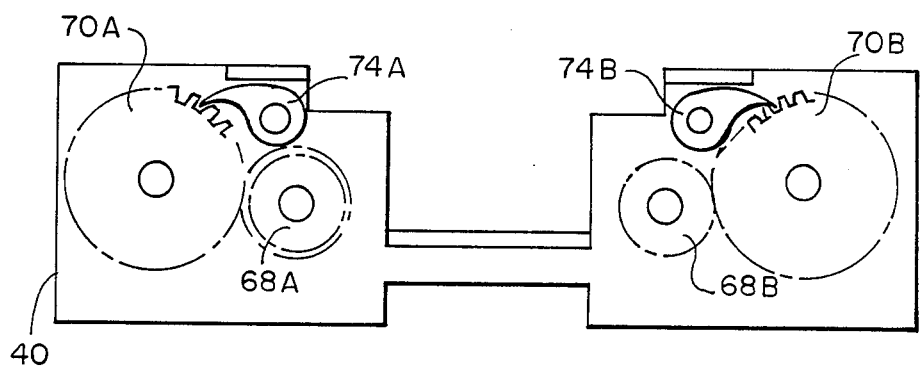
FIG. 5C is a bottom sectional view of the FIG. 4A driving mechanism.

Present invention apparatus 4, the respective front and back views of which are shown in corresponding FIGS. 2 and 3, is shown schematically in FIGS. 2 and 5B–5C. Needless to say, the same components are represented by the same numbers.

Figure 4A:
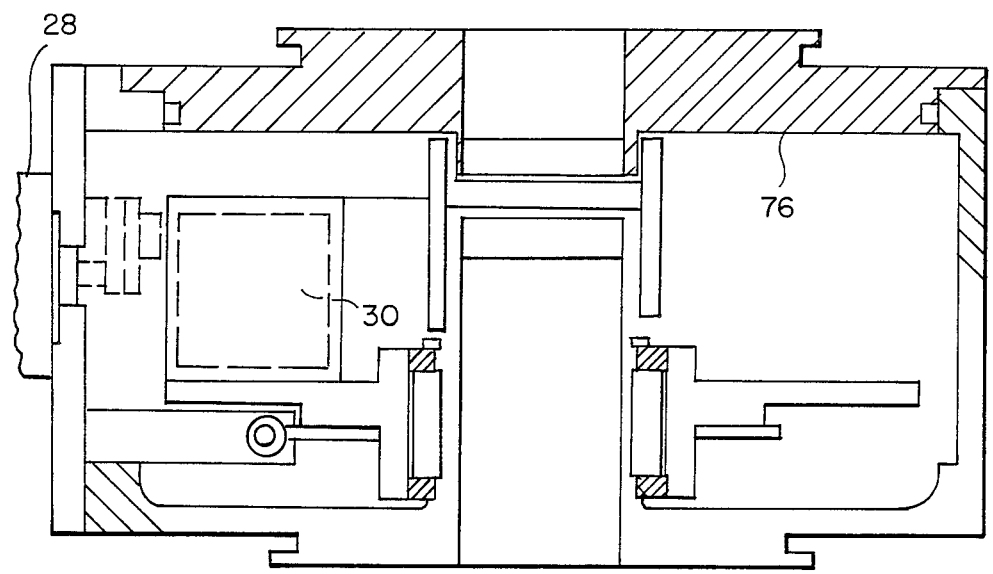
FIG. 4A shows a side view of the present invention apparatus.
Figure 5A:
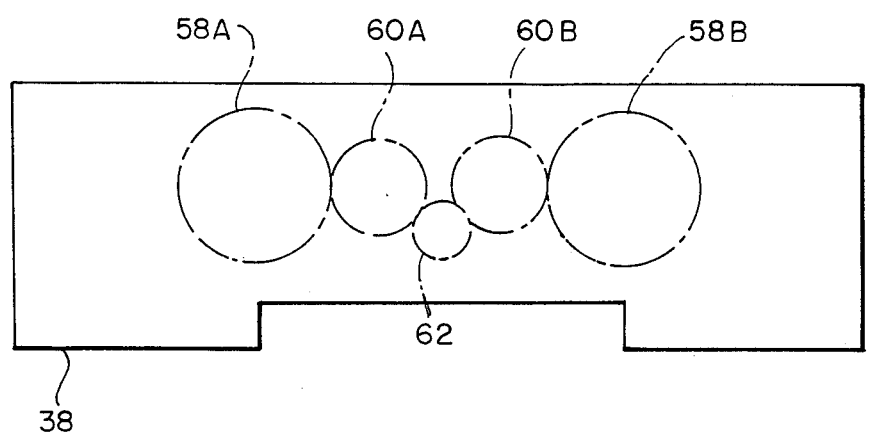
FIG. 5A is a top sectional view of the driving mechanism within the apparatus.
Figure 4B:
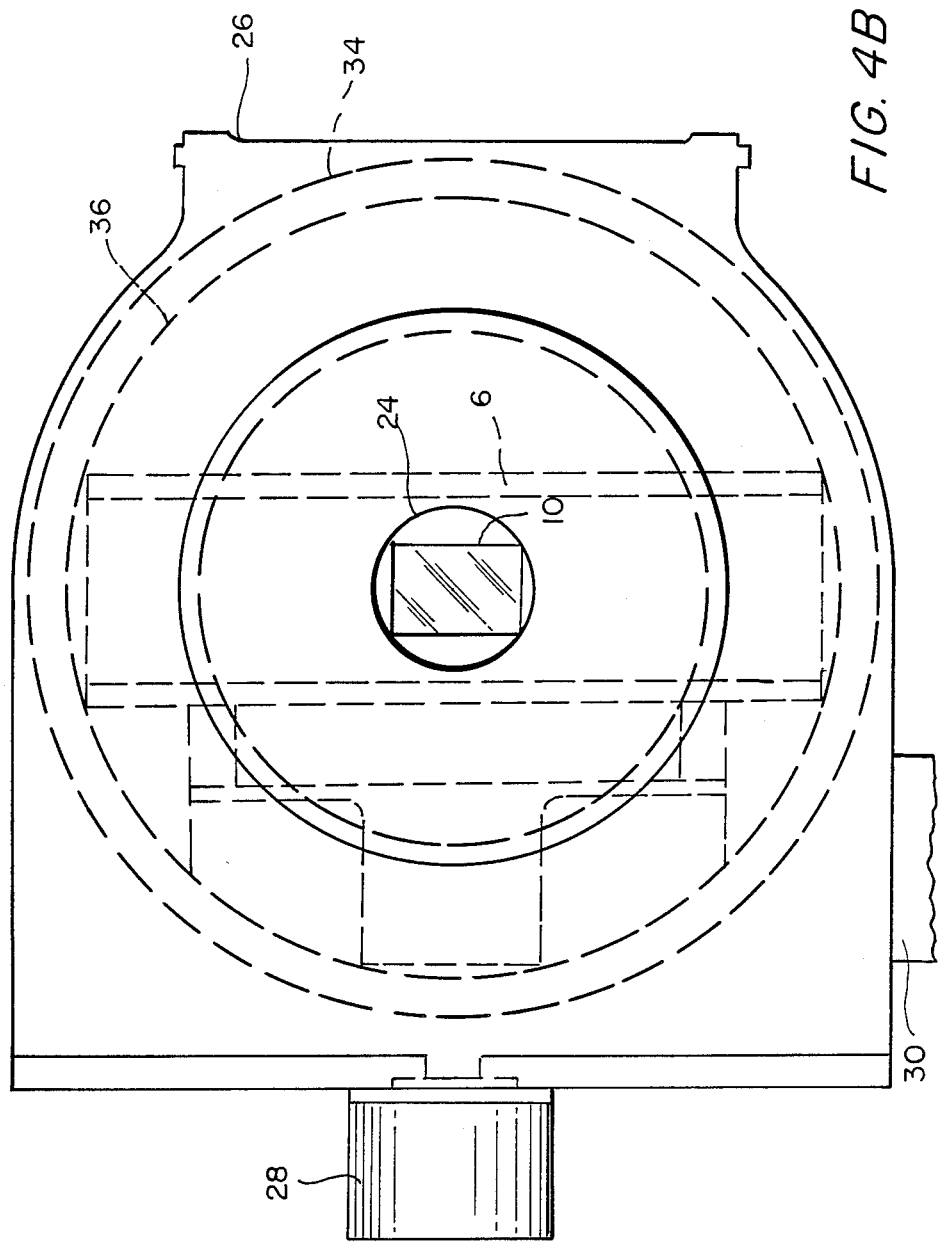
FIG. 4B is a rear view of the present invention apparatus.

Referring now to FIGS. 2 to 4, there is shown an opening 24 located at the back side of apparatus 4. Opening 24 is situated approximately in the center of housing 26, which has coupled thereto stepping motors 28 and 30. The opening is precisely located along the optical centerline and must be referenced so that the film can be precisely located with reference to the same centerline and window. Sets of wires 28W and 30W are respectively connected to stepping motors 28 and 30. An indexer 32 is connected to stepping motor 30. The functions of the respective stepping motors and the indexer will be discussed further in the specification.

Within housing 26 is a cylindrical cavity 34. A platform 36 is movably mounted within cavity 34. For the sake of simplicity, the gears for mounting platform 36 to housing 26 are not shown, as they are conventional. Fixedly mounted on platform 36 is driving mechanism 6, which is to be discussed with reference to FIGS. 2, 4B and 5A to 5C.

Referring to these figures, it can be seen that driving mechanism 6 has first and second supporting plates 38 and 40, respectively. Transversely coupled to plates 38 and 40 is third support plate 42 which has aperture 10 thereon. Like that of opening 24, aperture 10 is precisely located along the optical center line and must be referenced so that the film can be precisely located with respect to the same center line and window. An extension piece 44, which is best seen in FIG. 5B, extends from first support plate 38. Holes 46 in extension 44 are used to mount driving mechanism 6 to platform 36.

Interposed between first and second supporting plated 38 and 40 are opposing take up spools 48A and 48B. Adjacent to the respective take up spools are guide rollers 50A and 50B. Next to the respective guide rollers are opposed sprocket rollers 52A and 52B. Situated between aperture 10 and the respective sprocket rollers is a second set of guide rollers 54A and 54B. As can be seen in FIG. 5B, the take up spools, the two sets of guide rollers and the sprocket rollers are journalled to first and second support plates 38 and 40. A film which is to be guided and aligned with aperture 10 is stored in either one, or both, of take up spools 48A and 48B. The film is wound and guided by the different rollers and spools as shown by line 56. Additionally, "floating" idler rollers could be used to maintain a constant film tension.

Focussing now on the end of sprocket rollers 52A and 52B, which are journalled to first support plate 38, there is seen affixed to each end of the respective sprocket rollers corresponding spur gears 58A and 58B. Engaged to gears 58A and 58B are respective direction changing gears 60A and 60B. These direction changing gears are in turn engaged to a main drive gear 62, which is connected by means of rod 64 to a connecting gear 66, to be engaged to motor 28. To ensure that the gears are in positive engagement with each other, each of the gears has a corresponding washer 68 for holding the gears in place. When gear 66 is turned, gears 58A and 58B are in turn rotated in the direction to which gear 66 is turned. Accordingly, sprocket rollers 52A and 52B are likewise turned toward that direction.

The respective ends of sprocket rollers 52A and 52B, journalled through second support plate 40, are correspondingly affixed to spur gears 68A and 68B. Engaged to spur gears 68A and 68B are gears 70A and 70B, respectively. These gears are in turn connected by means of corresponding drive rods to take up spools 48A and 48B. Thus, were sprocket roller 52A rotated by main drive gear 62 in a counterclockwise direction, gear 70A would rotate in a clockwise direction, thereby effecting take up spool 48A to wind the roll of film in a clockwise direction. Likewise, if main drive gear 62 is rotated in a clockwise direction, sprocket roller 52B would similarly rotate in a clockwise direction, thereby causing gear 70B to effect take up spool 48B to rotate in a counterclockwise direction. It should be noted that affixed to the ends of the rollers for take up spools 48A, 48B and sprocket rollers 52A, 52B are respective slip clutches 72A to 72B. These clutches, as is well known, are used to maintain the respective rollers frictionally such that if a certain force is applied thereto, gears 70A, 70B and 68A, 68B would stay static while the rollers connected thereto would rotate.

To provide for bi-directional movement for the roll of film and to ensure that the film would not be torn, pawl 74A is used to maintain drive gear 70A from turning when main drive gear 62 is turned clockwise and pawl 74B is used to maintain drive gear 70B from turning when main drive gear 62 is turned clockwise. See FIG. 5C.

In operation, a cassette or roll of film is placed in the spindle area of the take up spools, guide rollers and sprocket rollers. The film is threaded in accordance to line 56 through aperture 10 and hooked up to the respective take up spools. The housing may be filled with a liquid which contains, for example, xylene or decahydronaphalene (decalin). This liquid has an index of refraction close to or identical to that of the film under test. By thus matching the indices of refraction, scratches, warpage and nicks in the film would be compensated for; and a laser beam passing through the film would be spatially amplitude modulated and unaffected by the aforecited anomalies of the film. The housing is then sealed by a cover 76 (see FIG. 4A). It should be appreciated that the sprocket rollers could be replaced by a pair of pressure rollers so that unperforated film could be used in the invention.

Upon command (from a computer not shown), stepping motors 28 and 30 would set up the linear and rotational requirements on the film. These commands are based upon requirements dictated by the optical matched filter memory such as 14. Alternatively, the stepping motors can also respond in accord with an interaction with an operator. For example, suppose different symbols located at different frames of the roll of film are to be compared with a matched filter memory in only one direction. A light beam from laser 2 is directed onto aperture 10 and stepping motor 28 would wind the film such that symbols on each frame are compared with predefined symbols in memory 14. To effect the translation movement, a gear from stepping motor 28 (not shown) engages connecting gear 66, whereupon gears 58A and 58B are rotated in accordance with the direction of rotation of gear 66. Accordingly, sprocket rollers 52A and 52B likewise would turn in the direction of rotation. As gears 70A and 70B are respectively engaged to gears 68A and 68B, the corresponding take up spools 48A and 48B are turned in a direction opposite to the direction of rotation of gear 66, thereby winding or releasing the film in the appropriate spools. Due to friction applied to drive gears 70A and 70B by respective pawls 74A and 74B, the driving mechanism can be rotated bi-directionally without causing any damage to the film.

Suppose the symbols on the film require both linear and rotational motions. For this case, a translation of the appropriate frame is first effected by translation stepping motor 28. Platform 36 is then rotated by rotation stepping motor 30 via gears within housing 26. It should be noted that gears for rotating a platform are conventional and are not shown for that reason. It should further be noted that the platform may be rotated approximately 350°. The degree of orientation is illustrated by indexer 32. See FIG. 3. Upon comparison of both translated and rotated symbols with those stored in memory 14, platform 36 is rotated back to its initial position and stepping motor 28 would translate the film to a new frame. Symbols on this new frame would be rotated as before and the new symbols thereon are again compared with predefined symbols stored in memory 14.

In actuality, the symbols on the film may represent targets such as ships and tanks which were taken from high speed aircraft during reconnaissance flights. And by placing apparatus 4 under computer control by means of wires 28W and 30W, the comparison of the targets with predefined symbols would proceed at a rate 18 to 50 times faster than previous photo interpreters, which can process approximately three centimeters square of film per second.

Figure 6:
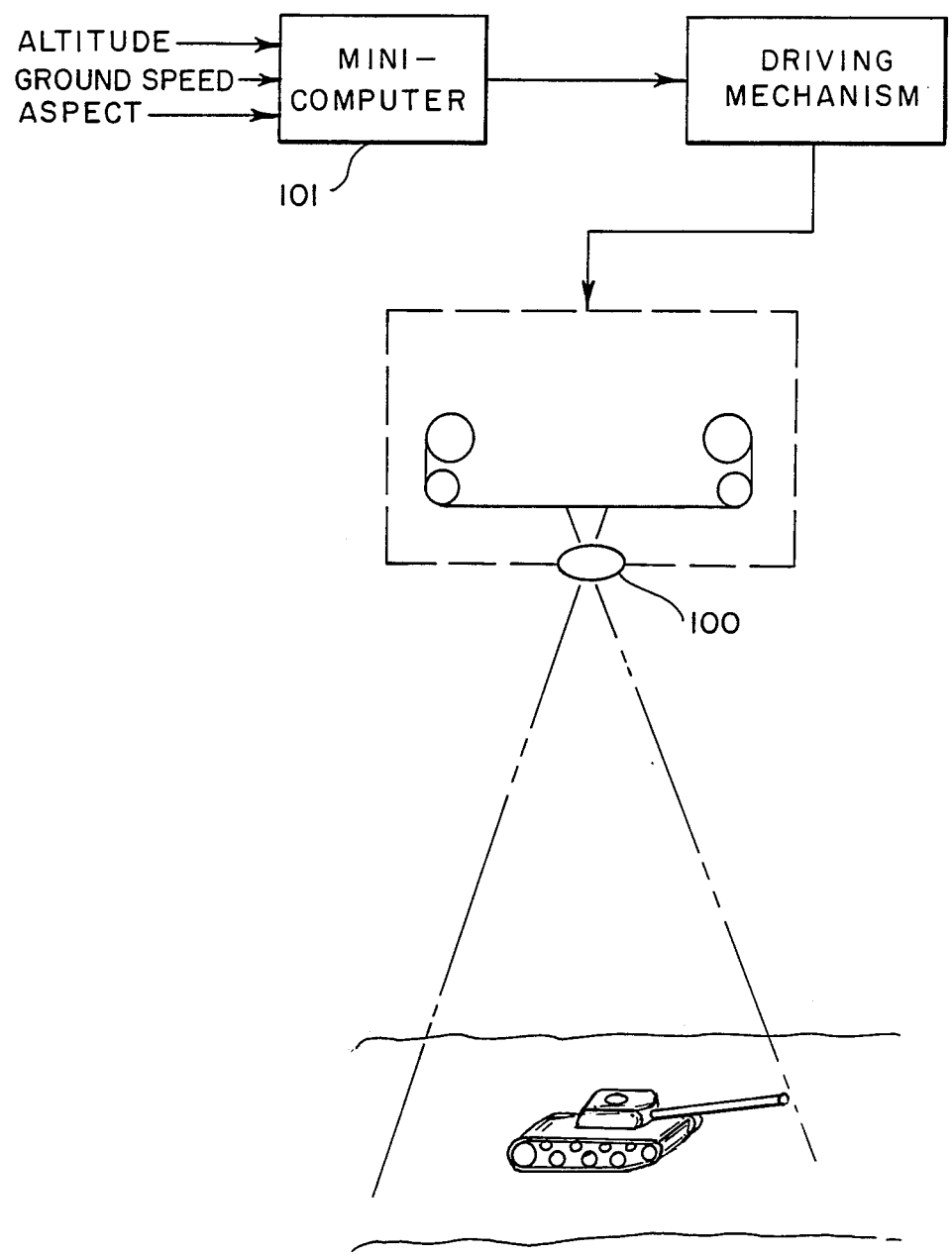
FIG. 6 shows the present invention driving mechanism being used as an image motion compensation device.

In an alternate mode, the invention can be used as an image motion compensation device. See FIG. 6. For this device, the laser, memory, detector and display are not used. Rather, the scene to be photographed is imaged by a lens 100 on the film in invention apparatus 4. Information relative to the aircraft flight such as ground speed, altitude and aspect are fed into a mini-computer 101 which then controls the rotational and translational requirements of image recording. Not shown in FIG. 6 are such elements of a camera as a shutter and filter.

Operation of this invention is similar to that described above except that the film motion here is moved in order to compensate for aircraft/vehicle motions. More precisely, the movement of the film is dependent on the ratio between the altitude distance from the ground to the lens and the focal distance from the lens to the film. In other words, assuming that the dimension between the altitude distance and the focal distance are proportional, the movement of an of interest target can be compensated by a proportional movement of the film. To illustrate, consider the following: If the focal length of the lens to the film is one foot and the altitude is 5,000 feet, than the ratio therebetween is 5,000 to 1. Therefore, if the of interest target on the ground has moved a hundred feet during the exposure time, there must be a movement of 1/500 of a hundred feet in the plane of the film. This movement, of course, must take into account the speed and the time in which the shutter is opened and is effected by the previously mentioned stepping motors under the control of mini-computer 101. Suffice it to say that the input of parameters such as altitude, ground speed and aspect into mini-computer 101 is conventional. Further, it should be appreciated that the actuation of the stepping motors by mini-computer 101 is also well known.

Having explained the invention in detail, it should be understood that the invention is not limited to the exact details of construction shown and described herein for obvious modification would occur to persons skilled in the art.

What is claimed is:

1. Apparatus for driving a continuous strip linearly and rotatively, comprising:
    a housing having an opening;
    a platform movably set within the housing;
    a strip driving means fixedly mounted to the platform, the driving means including:
       (a) a first support plate;
       (b) a second support plate;
       (c) a third plate having an aperture concentrically aligned with the opening interposed transversely between the first and second plates;
       (d) means for holding and guiding the strip movably mated to the first and second plates, a portion of the strip being superimposed on the aperture;
       (e) bi-directional positioning means engaged to the holding and guiding means for translating the strip to a particular frame across the aperture;
    first actuating means secured to the housing for driving the bi-directional positioning means, thereby moving the strip across the aperture;
    second actuating means secured to the housing for rotatably moving the platform, thereby rotating the strip;
    whereby the strip is translated and rotated for correlating symbols on each frame of the film at any orientation with predefined symbols.

2. Apparatus according to claim 1, further comprising:
    fluid having an optical index of refraction matching that of the strip filling the housing, thereby optically compensating for scratches, warpage and nicks on the strip.

3. Apparatus according to claim 1, wherein the holding and guiding means comprises:
    first and second take up spools positioned at opposite ends of the aperture, opposed ends of each journalled to respective first and second support plates;
    first and second opposed rollers positioned relative to the respective first and second spools for guiding the strip along the aperture, the ends of the rollers being journalled to the first and second support plates;
    a plurality of guide rollers working cooperatively with the spools and the opposed rollers for ensuring the smooth movement of the strip.

4. Apparatus according to claim 3, wherein the bi-directional positioning means comprises:
    first and second spur gears affixed respectively to the ends of the first and second opposed rollers journalled to the first support plate for rotating the opposed rollers;
    first and second direction changing gears engaged respectively to the first and second spur gears;
    a main driving gear engaged to the first and second direction changing gears for controllably rotating the opposed rollers.

5. Apparatus according to claim 4, wherein the first actuating means drives the main driving gear and the second actuating means rotates the platform.

6. Apparatus according to claim 4, wherein the bi-directional positioning means further comprises:

first and second friction held drive gears affixed respectively to the ends of the first and second opposed rollers journalled to the second support plate;

third and fourth friction held drive gears affixed to respective ends of the first and second spools journalled to the second support plate, the third and fourth drive gears being engaged respectively to the first and second drive gears;

first and second pawls engaged respectively to the third and fourth drive gears; whereby, if the main driving gear is rotated clockwise, the first pawl prevents the third and first drive gears from rotating; and, if the main driving gear is rotated counterclockwise, the second pawl prevents the fourth and second drive gears from rotating; thereby preventing the strip from being torn.

7. Apparatus according to claim 1, wherein the first and second actuating means comprise stepping motors.

8. Apparatus according to claim 7, wherein the second actuating means further comprises:
an indexing means for indicating the degree of rotation for the apparatus.

9. Apparatus for driving a film having symbols stored thereon translationally and rotatively, comprising:
a platform;
a driving means mounted on the platform, the driving means including:
 (a) a first plate having an aperture;
 (b) second and third plates for supporting the first plate longitudinally;
 (c) means journalled to the second and third plates for holding and guiding the film in alignment with the aperture;
first actuating means for bi-directionally translating the holding and guiding means to linearly move at least one particular symbol of the film in alignment with the aperture;
second actuating means for rotating the platform, thereby moving the symbol to a predetermined orientation for correlation with predefined symbols.

10. Apparatus according to claim 9, further comprising:
fluid having an optical index of refraction matching that of the strip to optically compensate for imperfections on the strip.

11. Apparatus according to claim 9, wherein the holding and guiding means comprises:
first and second spur gears affixed respectively to the ends of first and second opposed rollers journalled to the first plate for rotating the opposed rollers;
first and second direction changing gears engaged to the first and second spur gears;
a main driving gear engaged to the first and second direction changing gears for controllably rotating the opposed rollers;
first and second friction held drive gears affixed respectively to the ends of the first and second opposed rollers journalled to the second plate;
third and fourth friction held drive gears affixed to the respective ends of the first and second spools journalled to the second plate, the third and fourth drive gears being engaged respectively to the first and second drive gears;
first and second pawls engaged respectively to the third and fourth drive gears;
whereby, if the main driving gear is rotated clockwise, the first pawl prevents the third and first drive gears from rotating; and, if the main driving gear is rotated counterclockwise, the second pawl prevents the fourth and second drive gears from rotating; thereby preventing the film from being torn.

12. Apparatus according to claim 9, further comprising:
processor means for controlling the first and second actuating means.

13. In an apparatus for compensating image motions of of interest targets, the apparatus having a film stored therein, the apparatus comprising:
a platform;
a driving means mounted on the platform, the driving means including:
 (a) a first plate having an aperture;
 (b) second and third plates for supporting the first plate longitudinally;
 (c) means journalled to the second and third plates for holding and guiding the film in alignment with the aperture;
first actuating means for bi-directionally translating the holding and guiding means to linearly move the film in alignment with the aperture;
second actuating means for rotating the platform to orient the film in alignment with the aperture;
means for sensing, in relation to the film, movement parameters of the of interest target;
means for driving the first and second actuating means in response to the sensed parameters;
wherein the film is translationally and rotatively moved in proportion to movements of the of interest target for compensating image motions caused by the movements.

14. Apparatus according to claim 13, wherein the driving means comprises a processor means.

* * * * *

UNITED STATES PATENT AND TRADEMARK OFFICE
CERTIFICATE OF CORRECTION

PATENT NO. : 4,764,781

DATED : August 16, 1988

INVENTOR(S) : Kenneth G. Leib, et al.

It is certified that error appears in the above-identified patent and that said Letters Patent is hereby corrected as shown below:

Column 3, line 42, change "plated" to --plates--.

Signed and Sealed this

Third Day of January, 1989

Attest:

DONALD J. QUIGG

Attesting Officer

Commissioner of Patents and Trademarks